(12) United States Patent
Andersson

(10) Patent No.: US 7,887,745 B2
(45) Date of Patent: Feb. 15, 2011

(54) REFLECTING MATERIAL

(75) Inventor: Stig Andersson, Hoganas (SE)

(73) Assignee: Headlight Helmets AB, Vaxjo (SE)

(*) Notice: Subject to any disclaimer, the term of this patent is extended or adjusted under 35 U.S.C. 154(b) by 41 days.

(21) Appl. No.: 11/094,702

(22) Filed: Mar. 30, 2005

(65) Prior Publication Data

US 2007/0269669 A1 Nov. 22, 2007

Related U.S. Application Data

(63) Continuation-in-part of application No. 09/623,546, filed on Dec. 11, 2000, now abandoned.

(51) Int. Cl.
*B29C 51/10* (2006.01)
*B29C 51/14* (2006.01)

(52) U.S. Cl. ............. 264/571; 264/320; 264/322; 264/510

(58) Field of Classification Search .......... 264/510
See application file for complete search history.

(56) References Cited

U.S. PATENT DOCUMENTS

| | | | | |
|---|---|---|---|---|
| 4,505,967 A | * | 3/1985 | Bailey | 428/164 |
| 5,413,661 A | * | 5/1995 | Spengler et al. | 156/515 |
| 5,525,290 A | * | 6/1996 | Carpenter | 264/510 |
| 5,885,677 A | * | 3/1999 | Gosselin et al. | 428/40.1 |
| 6,174,396 B1 | * | 1/2001 | Casteel et al. | 156/213 |

* cited by examiner

*Primary Examiner*—Monica A Huson
(74) *Attorney, Agent, or Firm*—Harness, Dickey & Pierce, P.L.C.

(57) ABSTRACT

A method of manufacturing a retro-reflective shell having a curved or irregular surface for reflecting light in all directions from a laminated product, comprising a substantially flat sheet of a plastic material and a reflective layer on at least one side of said flat sheet plastic material. The reflective layer comprises a transparent adhesive substance and transparent glass or plastic pearls with a diameter between 0.01 and 0.05 mm. The substance adheres to the flat sheet plastic material, to form the laminated product. The product is heated to a thermo-vacuum-forming temperature, whereupon the product is vacuum-formed on a mould having the desired curved or irregular surface shape, in order to form a shell.

19 Claims, 2 Drawing Sheets

REFLECTING MATERIAL

This is a continuation-in-part application Ser. No. 09/623,546, filed Dec. 11, 2000 now abandoned.

FIELD OF THE INVENTION

The present invention refers to a method for thermo-vacuum-forming reflective material for the manufacturing of a reflective product as well as to the use of this material for the manufacturing of a reflective product by means of thermo-vacuum-forming.

BACKGROUND OF THE INVENTION

While performing different activities during more or less bad light conditions, it may be important for a person performing the activities to be visible. A person can obtain a lower degree of visibility by different types of reflective tapes, so as to be visible during poor light conditions. The question of visibility does not only apply to different types of spare time activities, such as bicycling and horse riding, but also to activities related to employment, such as firemen and policemen, who have to be provided with adequate reflector means when working professionally under conditions of low levels of lighting. In this connection a "reflector means" refers to any means in which light is reflected in directions close to the direction from which it came.

In traffic environment, it is especially important to protect the head, and this applies to children as well as grown-ups. However, conventional helmets are not easily visible, for example, by motorists at night, and the user may risk injury from a traffic accident during such occasions even if a helmet is used. In order to alert a motorist under these conditions, several types of reflective warning signs, which are visible at night, are now commercially available.

However, ordinary flat reflector means may have a limited protective effect by only reflecting light from one direction. Different kinds of adhesive reflective tapes exist which can be fastened on clothes or helmets. However, a self-adhesive material, such as a sticker, cannot conveniently be applied to a curved surface due to the formation of wrinkles. It can neither be applied to a material in the form of a sheet, which subsequently is fixed onto a curved surface by means of thermoforming, since the material will then form cracks. Due to the above-mentioned problems, reflective materials according to the state of the art rapidly loose their reflecting properties when applied to irregular or curved surfaces.

SUMMARY OF THE INVENTION

An object of the invention is to provide a reflective material which can be used both as a reflective plane sheet per se and as a material for thermoforming, preferably by means of vacuum forming, to a curved or irregular surface, the material retaining its reflecting property without crack formation. In one aspect, there is provided a method of manufacturing a retro-reflective shell having a curved or irregular surface for reflecting light in all directions, comprising providing a substantially flat sheet of a plastic material; applying a reflective layer on at least one side of said flat sheet plastic material, said reflective layer comprising an transparent adhesive substance and transparent glass or plastic pearls with a diameter between 0.01 and 0.05 mm, said substance adhering to said flat sheet plastic material, to form a laminated product; heating said laminated product to a thermo-vacuum-forming temperature; and thermo-vacuum-forming said laminated product on a mould having said curved or irregular surface shape, in order to form a shell. In another aspect, there is provided a retro reflective shell having a curved or irregular surface for reflecting light in all directions, comprising a flat sheet of a plastic material; a reflective layer on at least one side of said flat sheet plastic material, said reflective layer comprising a transparent adhesive substance and transparent glass or plastic pearls with a diameter between 0.01 and 0.05 mm, said substance adhering to said flat sheet plastic material, thereby forming a laminated product having been exposed to a thermo-vacuum-forming method to provide said curved or irregular surface.

BRIEF DESCRIPTION OF THE DRAWINGS

Further objects, features, and advantages will appear from the description given below of several embodiments of the invention with reference to the accompanying drawings, in which.

DETAILED DESCRIPTION OF EMBODIMENTS

Figure 1:
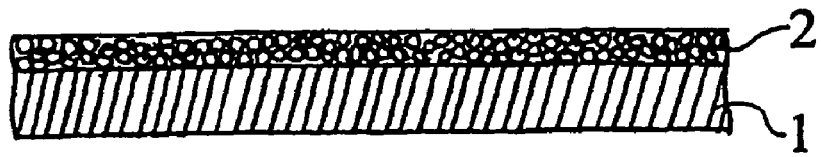
FIG. 1 is a schematic cross-sectional view through a reflective material in the form of a sheet.

FIG. 1 shows the reflective material consisting of a flat sheet 1 which is coated with a reflective layer 2. The sheet 1 can be of any type of plastic material. However, the sheet may be made of a transparent thermoplastic polymeric material, preferably crystal-clear polyvinyl chloride (PVC) or polyester.

The reflective layer 2 comprises a suspension of pearls, for example of glass or plastic, in an adhering or adhesive substance, such as a lacquer. In this connection a lacquer means a non-pigmented liquid with an organic film forming substance, which can be a natural resin, a synthetic resin or oil. A so-called screen-printing lacquer may be used.

The pearls having a specific size are mixed with the adhering or adhesive substance. The pearls may have a diameter between 0.01 and 0.05 mm and be made of glass or plastic. The adhesive substance should be able to attach to the plastic at the same time, as it should be able to bind to the pearls. Thus, the adhering substance comprises an etching transparent glue coating. In this connection etching refers to an increase in surface roughness of the plastic by partial dissolution of the same. After the application of the reflective layer 2, the adhesive substance is hardened, such as by means of heat. It may alternatively be hardened in other ways, for example by means of radiation.

In order to obtain a reflective laminated material, the adhering substance and pearls are mixed into a suspension which should have a consistency so that the pearls of microscopic size are able to be transferred to the plane sheet 1 by means of a known technique in the form of screen printing (silk screen processing). This is a method, which normally is used for applying a pattern to a plastic sheet. The size of the pearls is thus also adapted to be able to pass through the open holes of a screen stencil, which may be used for pressing a pattern medium against the sheet. When the pearls are of glass, they should be polished pearls of high quality. The same type of glass pearls as in existing reflective tapes can be used with advantage.

By this procedure, the suspension is anchored on the flat sheet or material and a reflective surface is obtained. The more pearls that are mixed into the suspension, the better reflectance will be. The amount of pearls may be more than 25%, such as more than 50% of the total volume but normally less than 75%. The amount of glass pearls suspended in the adhering substance in the form of a lacquer could surprisingly comprise as much as 85%. This results in the consumption of 1 kg glass pearls for covering 4-5 $m^2$ of the sheet, which after thermoforming for example can be used for shells for about 50 helmets of normal size.

The material can in this embodiment also be used for achieving a reflection in two directions, by the reflective layer being applied to both sides of a suitable surface. It is of advantage if this surface is a sheet of plastic material, which can be thermo-vacuum-formed. Preferably all kinds of existing materials of polyvinyl chloride (PVC) are used, i.e. all thermoplastic materials which comprise polymers of vinyl chloride. The plane reflective material can alternatively be used without thermo-vacuum-forming in the form of a traffic sign or another warning sign indicating danger or other circumstances, which should be observed by the public.

When the reflective layer 2 has been applied to the sheet 1, other patterns can be printed on the material according to the invention. The sheet 1 with the reflective layer 2, i.e. the laminated product, is then thermo-vacuum-formed for forming a shell adapted to the curved surfaces. The thermoplastic material according to the invention, in the form of a flat and flexible sheet or foil of a thickness, which is sufficient for vacuum forming, is heated to its vacuum forming temperature and is formed to a general contour of a mould by means of a pressure difference. Thus, vacuum forming is performed by means of known techniques for example at 130° C., the material being drawn and stretched to a shell which for example has the outer shape of a helmet. The temperature may be from about 100° C. to about 180° C., such as between about 120° C. to about 150° C., such as about 130° C.

After cooling, the thin shell thus formed is divided into separate units, and holes are optionally punched out therein. If the shells are to be used in a finished product in the form of a helmet, the shell is finally glued or otherwise attached to an inner helmet blank for protecting the head.

Figure 2:
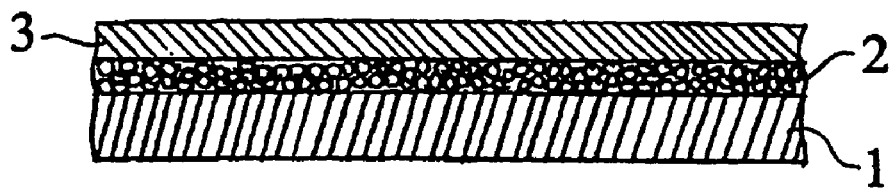
FIG. 2 is a schematic cross-sectional view through another embodiment of the reflective material.

The helmet can then, if desired, be provided with a further plastic layer. This can be necessary since the virtual reflection can be reduced, e.g. in humid weather. For this reason a further coating may be applied to the finished product, e.g. a layer, which protects the reflective layer and strengthens it even more. As shown in FIG. 2, this can be achieved by a further layer 3 of preferably PVC being applied by means of for example high frequency welding to the reflective layer 2, which in turn is disposed on the sheet 1. The light may be directed towards the reflective material from above as seen in FIGS. 1 and 2.

Figure 3:
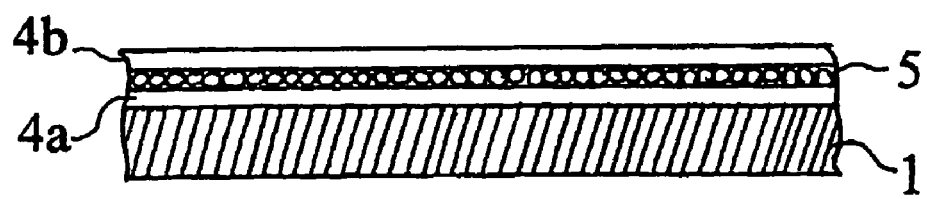
FIG. 3 is a schematic cross-section view through an alternative embodiment of the reflective material.

Another embodiment of the reflective layer is shown in FIG. 3, and comprises a flat or plane sheet 1 of a plastic material as shown in FIG. 1, said material being moldable by means of thermo-vacuum-forming. In this embodiment a layer 4a of an adhering substance is arranged on the sheet 1, and a thin layer 5 of pearls is applied to the layer 4a. A further layer 4b of an adhering substance is again disposed over the layer 5 of pearls.

The layers 4a and 4b preferably consist of the same transparent glass-clear adhering substance in the form of a lacquer, the lacquer in the layer 4a being etching as in the previous embodiment.

With reference to FIG. 3, the reflective laminated material is achieved by applying the etching layer 4a of adhering substance to the sheet 1. Pearls are spread onto layer 4a before it has dried. This can for example be accomplished mechanically with equipment, which usually is utilized for coating different kinds of powders. Glass pearls are for example spread in this procedure so that they will fall down onto the still sticky layer 4a, thereby forming a monolayer of glass pearls contacting the layer 4a, possibly with non-adhering pearls arranged there above, forming a layer of pearls 5. The sheet with accompanying layers 4a and 5 is then allowed to pass an oven for curing of the adhering substance in the layer 4a. When this layer has been cured, non-adhering and freely moveable glass pearls can be removed and reused. Another layer 4b of adhering substance is then applied to the layer 5 of glass pearls, whereupon the sheet with accompanying layers then is allowed to pass the oven again for curing of the layer 4b.

The material according to this embodiment can also be vacuum formed into a reflective shell to be applied to a curved surface without any crackle formation taking place during the forming procedure. The reflective surface is sufficiently well adapted for many applications in order to provide for an efficient reflective effect.

Figure 4:
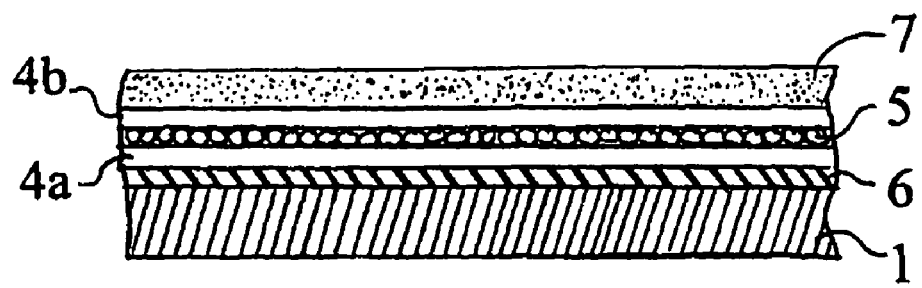
FIG. 4 is a schematic cross-sectional view through a further embodiment of the reflective material.

In FIG. 4, an embodiment is shown which is suitable when the material according to the invention is to be used for reflective helmets. The material may be arranged so that external light passes into the material from the flat sheet side, and is reflected back by the reflective layer 2 or 5. By arranging the product in the form of a shell made from the material according to the invention, for example on the inside of a bicycle helmet, in which holes have been cut out, through which the reflective material is visible from the outside, the reflective product can be used where it is more protected from the surrounding world, i.e. inside the helmet. In this embodiment this can be achieved by a layer of the material according to the invention being arranged on that side of the sheet 1 which in the finished helmet will not be directed towards the light source, i.e. the sheet 1 acts as a protecting layer for the other layers.

With reference to FIG. 4, a color layer 6 is arranged between the sheet 1 and the layer 4a. The color layer 6 may comprise a transparent dye known in the art, which can be excluded in dependence of the design and appearance of the final product. The reflective layer is arranged as in the preceding embodiment in the form of a single layer of pearls, for example of glass or plastic, between two layers 4a and 4b of adhering substance. In this connection the adhering substance used should be able to etch the dye layer as well as the plastics.

A layer 7 of a material with high gloss, for example comprising silver or aluminum, is disposed on the layer 4b of adhering substance in order to further amplify the reflection. Thus, when the reflective layer 5 is illuminated from below in FIG. 4, the light, which has not been immediately reflected by this layer, will be reflected with complete reflectance by the layer 7 and re-transmitted towards the observer after having passed the pearls in the layer 5.

The layer 7 is preferably applied to the laminate as a paste of commercial aluminum particles by means of the above-mentioned technique in the form of screen-printing.

The reflective laminated material can then be heated to a temperature, which is suitable for vacuum forming, e.g. 130°

C., thermo-vacuum forming then being performed as described above. The reflective material in the form of a sheet according to the invention should in this connection have a thickness, which is sufficient considering the product contemplated after vacuum forming. The material can for example be vacuum formed into a shell in the form of a helmet which becomes highly reflecting from the outside with the reflective layer on the inside of the helmet, the reflective layer thus being protected against all types of damages. In this way a helmet of impact-resistant plastic can be achieved with reflective patterns as well as usual patterns, which can result in increased road safety, especially for children.

It should be observed, that a color layer, if desired, could be arranged in a corresponding way in the other embodiments. In this connection the location of the color layer in the laminate is not crucial. A dye may also be mixed into the suspension of pearls and adhering substance, a reflection of the corresponding color then being obtained. In this connection the dyes should also be transparent. Furthermore, it is important that all transparent components in the material according to the invention retain this property after thermoforming, such as vacuum forming. The reflective layer may be arranged covering only a part of the surface of the flat sheet 1.

Warning articles manufactured from the above reflective material present a reflective construction, which is durable, rather cheap and quite visible under poor natural light conditions, especially at night, when the reflective articles are illuminated by an external active light source, such as a light from a head light of a car. By the vacuum forming property of the laminated material, the material can be used for increased safety, especially in traffic situations. Products having an irregular or curved surface can be produced with a functional reflectance. Thus, all kinds of light reflective products can be achieved, such as bicycle helmets, protective helmets for building workers and playing children. Accordingly, the reflective material can be used as a reflective device with the capability of reflecting light and thus being visible from all angles, i.e. a retro-reflective device generating a reflection in all directions and usable on a person as such. Other products for increased road safety can also be obtained by using the invention when a more or less completely reflecting surface is desired, such as hub caps with ornaments and reflective patterns.

Figure 5:
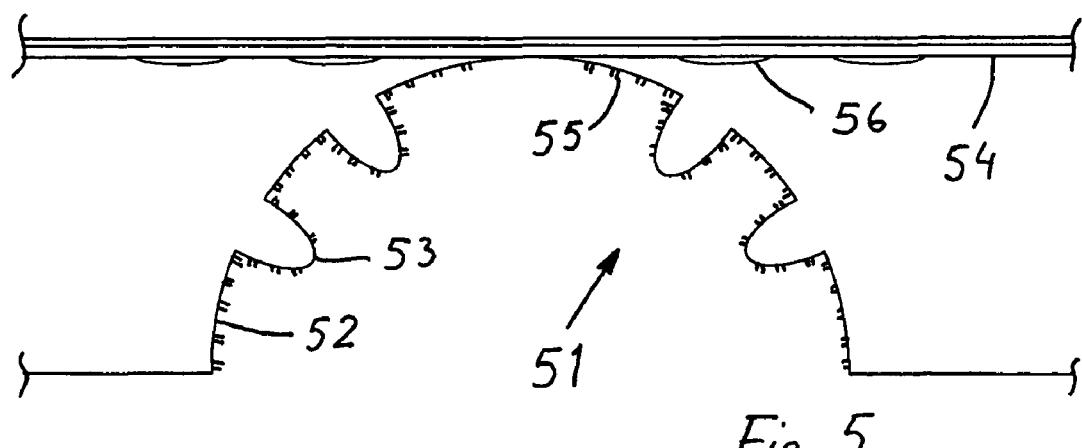
FIG. 5 is a schematic cross-sectional view of a mould for use according to the invention.

The material may be formed by thermo-vacuum-forming as indicated above. FIG. 5 shows a vacuum-forming mould in a cross-sectional view. In this case, the laminated product should be reformed to conform to the outer surface of a helmet blank made from foamed plastic. The helmet blank has several holes forming air ventilation openings. The mould 51 is formed similar to the helmet blank and comprises a substantially spherical main surface 52 provided with several substantially half-spherical indentations 53. The surface of the mould is provided with numerous vacuum openings 55. Inside the mould there is a substantial vacuum maintained by a vacuum source, not shown. Air is sucked through the numerous openings. The laminated product 54 is preheated to a temperature suitable for thermo-vacuum-forming, such as 130° C. Then, the laminated product 54 is arranged on top of the mould as shown in FIG. 5, and is sucked towards the main spherical surface 52. When the indentations 53 are covered by the sheet, the sheet portions covering the indentations are sucked into the indentations so that the sheet becomes conformed to the upper surface of the mould. The sheet is then allowed to cool down to approximately 20° C., whereupon the formed sheet is removed from the mould. The material now forms a shell having a form fitting to the outer surface of the helmet blank.

Figure 6:
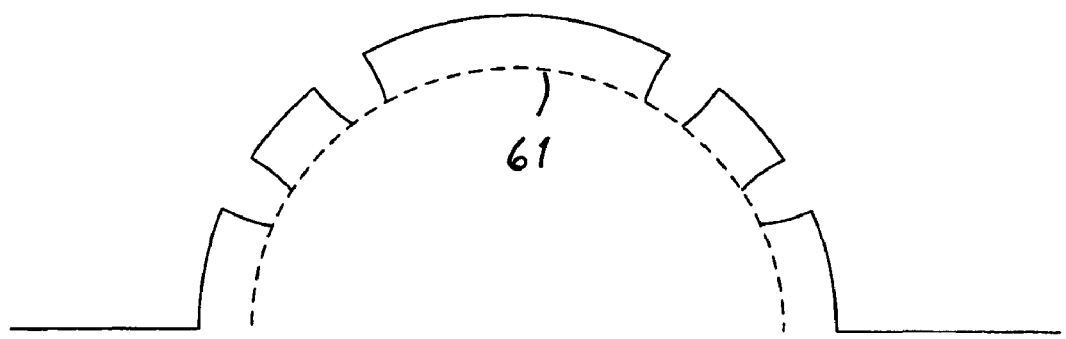
FIG. 6 is a schematic cross-sectional view similar to FIG. 5 and showing a severing line.

After being removed from the mould, the formed laminated product is exposed to a cutting operation as shown by broken lines 61 in FIG. 6 in order to remove the inner portions of the indentations, thereby forming holes in the shell.

The flat sheet and the laminated product may have a uniform thickness. Since the material is drawn substantial during the thermo-vacuum-forming, the shell formed during the forming process may obtain different material thicknesses. However, the laminated product may alternatively have a non-uniform thickness, so that the areas being exposed to the largest drawing action will have a larger thickness as schematically shown at 56 in FIG. 5. In this way, a final product or shell having substantially equal thickness may be obtained.

The material is drawn in a ratio of at least 200%, such as at least 400% or even more than 800% in at least a portion thereof. This drawing action is performed without causing crack formation in the flat sheet or the reflective layer. The etching of the reflective layer 2 towards the flat sheet 1 or the intermediate layer 4a towards the flat sheet 1 makes it possible to achieve such high drawing actions without crack formations. Moreover, the forming takes place under increased temperature, which also is of importance for the successful procedure.

As indicated above, the adhesive substance of the reflective layer may be cured by heat, which means that the laminated product is exposed to an atmosphere with increased temperature. After that and without cooling, the product may, in an alternative embodiment, be exposed to a thermo-vacuum-forming temperature, whereupon the product is exposed to thermo-vacuum-forming without the need to be cooled to room temperature.

While several embodiments have been disclosed herein above, the different features of each embodiment may be combined in other ways than explicitly described and such combinations are intended to be within the scope of the present invention. For example, a reflective layer 2 may be arranged on both sides of the flat sheet. The layer 7 having high gloss may be arranged below the flat sheet 1 as seen in FIG. 4, in which case the light impinges the laminated product from above. The color layer 6 may alternatively be arranged instead of the high gloss layer 7. Further combinations occur to the skilled person reading this specification. The invention is only limited by the appended patent claims.

I claim:

1. A method of manufacturing a retro-reflective shell having a curved or irregular surface for reflecting light in all directions, the method comprising the steps of:
   providing a substantially flat sheet of a plastic material;
   applying a reflective layer on at least one side of said flat sheet plastic material by depositing a transparent adhesive substance and at least one of glass pearls and plastic pearls having a diameter between 0.01 and 0.05 mm onto said flat sheet plastic material forming a laminated product;
   hardening the laminated product by at least one of heat and radiation;
   heating said hardened laminated product to a thermo-vacuum-forming temperature;
   contacting the plastic material of the heated laminated product to a mould having at least one of a curved shape and an irregular surface shape;
   forming the retro-reflective shell by thermo-vacuum-forming said laminated product on the mould.

2. The method of claim 1, wherein said reflective layer is transferred to said flat sheet by screen printing.

3. The method of claim 1, wherein said adhesive substance is cured prior to said thermo-vacuum-forming.

4. The method of claim 1, wherein said adhesive substance is cured by heat during the heating step.

5. The method of claim 1, further comprising applying a protective plastic layer on top of the reflective layer.

6. The method of claim 1, wherein said plastic material of said flat sheet comprises one of polyvinyl chloride and polyester.

7. The method of claim 1, wherein the amount of pearls in the reflective layer is more than 25% and less than 75% of the total volume of the reflective layer.

8. The method of claim 1, wherein said adhesive substance is a lacquer, and the amount of pearls in the reflective layer is more than 25%, but no more than 85% of the total volume.

9. The method of claim 5, wherein said protective layer is composed of polyvinyl chloride, which is high frequency welded to said reflective layer.

10. The method of claim 1, wherein said adhesive substance is a lacquer.

11. The method of claim 1, further comprising applying on top of said reflective layer at least one of a high gloss material layer and a transparent dye layer.

12. The method of claim 1, further comprising applying below said flat sheet at least one of a high gloss material layer and a transparent dye layer.

13. The method of claim 1, further comprising applying between said flat sheet and said reflective layer at least one of a high gloss material layer and a transparent dye layer.

14. The method of claim 1, wherein said adhesive substance is etched at contact with said flat sheet plastic material, at least before curing.

15. The method of claim 1, wherein said thermo-vacuum-forming temperature is about 100° C. to about 180° C., preferably between about 120° C. to about 150° C., and more preferably at about 130° C.

16. The method of claim 1, wherein the material in the laminated product is drawn during the thermo-vacuum forming in a ratio of at least 200%, preferably at least 400% or preferably even more than 800% in at least a portion thereof.

17. The method of claim 16, wherein the laminated product has an increased thickness in the portion in which the laminated product is drawn.

18. The method of claim 2, wherein the reflective material is mixed into suspension in the adhesive substance prior to printing.

19. The method of claim 1, wherein the forming includes forming the retro-reflective shell in a shape fitting an outer surface of a helmet blank.

* * * * *

UNITED STATES PATENT AND TRADEMARK OFFICE
CERTIFICATE OF CORRECTION

PATENT NO. : 7,887,745 B2  
APPLICATION NO. : 11/094702  
DATED : February 15, 2011  
INVENTOR(S) : Andersson Page 1 of 1

It is certified that error appears in the above-identified patent and that said Letters Patent is hereby corrected as shown below:

On the Title page of the issued patent, please add the following identification numbers and information below number (22) "Item" and above number (65) "Prior Publication Data" as follows:

(86) PCT No.: PCT/SE99/000254  
(87) PCT Pub. No. WO/1999/045413  
    PCT Pub. Date: Sep. 10, 1999

On the Title page of the issued patent, please add the following identification numbers and information below the information listed in the "Related U.S. Application Data" Item (number (63)):

(30) Foreign Application Priority Data  
    Mar. 5, 1998    (SE) ................................ 9800689-3

In column 1, the paragraph starting at line 3, should read --This is a continuation-in-part application Ser. No. 09/623,546, filed Dec. 11, 2000 now abandoned, which is a National Stage Entry of PCT/SE99/000254, filed February 24, 1999 and which claims the benefit of Swedish Patent Application No. 9800689-3, filed March 5, 1998.--

Signed and Sealed this  
Twenty-first Day of February, 2012

David J. Kappos  
*Director of the United States Patent and Trademark Office*